United States Patent
Mechtel et al.

(10) Patent No.: US 6,288,198 B1
(45) Date of Patent: Sep. 11, 2001

(54) HYBRID COATING COMPOSITIONS

(75) Inventors: Markus Mechtel, Köln; Stefan Groth, Leverkusen; Lutz Schmalstieg, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/449,109

(22) Filed: Nov. 24, 1999

(30) Foreign Application Priority Data

Dec. 4, 1998 (DE) .............................................. 198 56 000

(51) Int. Cl.⁷ .................................................. C08G 77/26
(52) U.S. Cl. ................................. 528/28; 528/25; 528/38; 528/39; 528/44; 428/447; 428/423.1; 106/287.11
(58) Field of Search .................................. 528/28, 25, 38, 528/39, 44; 428/447, 423.1; 106/287.11

(56) References Cited

U.S. PATENT DOCUMENTS

| | | | |
|---|---|---|---|
| 3,856,756 | 12/1974 | Wagner et al. | 260/77.5 |
| 3,979,344 | 9/1976 | Bryant et al. | 260/18 TN |
| 4,474,933 | 10/1984 | Huber et al. | 528/26 |
| 4,625,012 | 11/1986 | Rizk et al. | 528/28 |
| 4,640,868 | 2/1987 | Penn | 428/446 |
| 5,109,057 * | 4/1992 | Tsuno et al. | 524/588 |
| 5,192,736 * | 3/1993 | Hanada et al. | 503/226 |
| 5,316,855 | 5/1994 | Wang et al. | 428/447 |
| 5,344,712 | 9/1994 | Basil et al. | 428/412 |
| 5,378,735 | 1/1995 | Hosokawa et al. | 522/79 |
| 5,378,790 | 1/1995 | Michalczyk et al. | 528/35 |
| 5,424,132 | 6/1995 | Bobrich et al. | 428/425.9 |
| 5,432,246 * | 7/1995 | Fenn et al. | 528/28 |
| 5,478,897 * | 12/1995 | Sasano et al. | 525/453 |
| 5,700,868 | 12/1997 | Hanada | 524/590 |
| 5,932,678 | 8/1999 | Meier et al. | 528/28 |

FOREIGN PATENT DOCUMENTS

| | | |
|---|---|---|
| 4020316 | 1/1992 | (DE) . |
| 307102 | 3/1989 | (EP) . |
| 353551 | 2/1990 | (EP) . |
| 0 505 737 | 9/1992 | (EP) . |
| 98/36007 | 8/1998 | (WO) . |

OTHER PUBLICATIONS

Patrick Finney, Adhesives Age, May 1995, pp. 30–32, "Computer Modeling Simulates Forward Roll Coating Process".

Judeinstein et al, J. Mater. Chem, 6, (month unavailable) 1996, pp. 511–525, "Hybrid organic–inorganic materials: a land of multidisciplinarity".

* cited by examiner

Primary Examiner—Robert Dawson
Assistant Examiner—Jeffrey B. Robertson
(74) Attorney, Agent, or Firm—Joseph C. Gil; Thomas W. Roy

(57) ABSTRACT

The present invention relates to hybrid coating compositions containing

A) 5 to 80 wt %, based on the weight of A) and B), of an aliphatic polyisocyanate-aminosilane adduct that is the reaction product of
  A1) a polyisocyanate component having an average NCO functionality of 2.5 to 5.5 and an isocyanate content, based on solids, of 9 to 50 wt % and containing aliphatic polyisocyanates with
  A2) at least 0.7 amino equivalents, based on the NCO equivalents of A1), of an aminosilane corresponding to formula (I)

$$(RO)_n Y_{3-n} Si—CH_2CH_2CH_2—NHZ \qquad (I),$$

wherein
  R and Y represent methyl and/or ethyl,
  Z represents H, $C_1$–$C_{12}$ alkyl, $CH_2CH_2CH_2$-$Si(OR)_2 Y_{3-n}$ and
  n has a value of 1, 2 or 3 and
  A3) optionally isocyanate-reactive compounds other than A2), and B) 20 to 95 wt %, based on the weight of A) and B), of at least one hydrolyzable silane corresponding to formula (II)

$$QSi(OX)_3 \qquad (II),$$

wherein
  X represents $C_1$ to $C_4$ alkyl and
  Q represents H, $C_1$ to $C_8$ alkyl, phenyl, methoxy, ethoxy, 3-glycidyloxypropyl, 3-aminopropyl and methacryloxypropyl and/or hydrolyzates/condensates obtained from these silanes.

The present invention also relates to the use of these coating compositions for coating various substrates, such as paints, plastics, granite, marble, metal, wood, leather and textiles.

20 Claims, No Drawings

HYBRID COATING COMPOSITIONS

BACKGROUND OF THE INVENTION

1. Field of the Invention

The present invention relates to coating compositions containing aliphatic polyisocyanate-aminosilane adducts and hydrolyzable silanes, and to substrates coated with these compositions.

2. Description of the Prior Art

The paint industry requires sophisticated coatings, e.g., in the automobile industry, which possess an ideal combination of very good mechanical properties, such as very high hardness and abrasion resistance, and also excellent flexibility and very good chemical properties, such as solvent and chemical resistance.

It is known that purely inorganic coating compositions based on a siloxanes, which have been produced by reacting hydrolyzable silane groups with water or dehydrating agents, are distinguished by high scratch resistance and chemical resistance. A generally known process for producing these purely inorganic coatings is the sol-gel Eprocess, which is described in detail by C.J. Brinker and W. Scherer in "Sol-gel science: The Physics and Chemistry of Sol-gel Processing", Academic Press, New York (1990). A severe disadvantage of these purely inorganic coatings is that they are brittle and prone to stress cracks. Therefore, purely inorganic coatings are not suitable for flexible substrates.

Various attempts are known from the literature for combining the positive properties of purely inorganic coatings with the properties of organic coatings. An overview of the so-called inorganic-organic hybrid coating compositions is found in J. Mater. Chem. 6 (1996) 511. Specific combinations are disclosed in U.S. Pat. No. 5,378,790, U.S. Pat. No. 5,344,712, U.S. Pat. No. 5,316,855, EP-A 565,044, EP-A 505,737 and in DE-A 4,020,316. However, none of these prior art coating compositions provides to the full extent the combination of properties required by the paint industry.

It is an object of the present invention to provide a coating composition that exhibits an improved balance between high hardness, abrasion resistance and chemical resistance on the one hand and high flexibility on the other.

Reaction products of aminosilanes with polyisocyanates are known (see e.g. "Adhesives Age", 5/1995, p. 30 ff.). Such moisture curing, alkoxy-silane-terminated polyurethanes are used increasingly in flexible sealing and adhesive materials curing at room temperature U.S. Pat. No. 5,700,868, U.S. Pat. No. 4,625,012, U.S. Pat. No. 4,474,933, U.S. Pat. No. 3,979,344, DE-A 4,234,325, DE-A 2,155,259). However, none of these literature references describe condensation products of aliphatic polyisocyanate-aminosilane adducts with hydrolyzable silanes and their use in sol-gel paints.

Surprisingly, it has now been found that condensation products of aliphatic polyisocvanate-aminosilane adducts with hydrolyzable silanes exhibit in sol-gel paint preparations an improved balance between high hardness, abrasion resistance and chemical resistance on the one hand and high flexibility on the other. The polyisocyanateaminosilane adducts react with the hydrolyzable silanes via polycondensation to form flexible inorganic-organic hybrid coatings having high hardness and very good solvent resistance.

SUMMARY OF THE INVENTION

The present invention relates to hybrid coating compositions containing

A) 5 to 80 wt %, based on the weight of A) and B), of an aliphatic polyisocyanate-aminosilane adduct that is the reaction product of
  A1) a polyisocyanate component having an average NCO functionality of 2.5 to 5.5 and an isocyanate content, based on solids, of 9 to 50 wt % and containing aliphatic polyisocyanates with
  A2) at least 0.7 amino equivalents, based on the NCO equivalents of A1), of an aminosilane corresponding to formula (I)

$$(RO)_n Y_{3-n} Si\text{—}CH_2CH_2CH2\text{-}NHZ \qquad (I),$$

wherein
  R represents methyl and/or ethyl,
  Y represents methyl and/or ethyl,
  Z represents H, $C_1$–$C_{12}$ alky, $CH_2CH_2CH_2$—$Si(OR)_2 Y_{3-n}$ and
  n has a value of 1, 2 or 3 and
  A3) optionally isocyanate-reactive compounds other than A2),
  and
B) 20 to 95 wt %, based on the weight of A) and B), of at least one hydrolyzable silane corresponding to formula (II)

$$QSi(OX)_3 \qquad (II),$$

wherein
  X represents $C_1$ to $C_4$ alkyl and
  Q represents H, $C_1$ to $C_8$ alkyl, phenyl, methoxy, ethoxy, 3-glycidyloxy-propyl, 3-aminopropyl and methacryloxypropyl and/or hydrolyzates/condensates obtained from these silanes.

The present invention also relates to the use of these coating compositions for coating various substrates, such as paints, plastics, granite, marble, metal, wood, leather and textiles.

DETAILED DESCRIPTION OF THE INVENTION

The hybrid coating compositions according to the invention contain 5 to 80 wt %, preferably 20 to 70 wt %, of aliphatic polyisocyanate-aminosilane adducts A) and 20 to 95 wt %, preferably 30 to 80 wvt %, of silanes B), wherein the preceding percentages are based on the preceding percentages are based on the solids content of components A) and B).

The compositions are prepared by reacting
A) 5 to 80 wt %, based on the weight of A) and B), of an aliphatic polyisocyanate-aminosilane adduct that is the reaction product of
  A1) a polyisocyanate component having an average NCO functionality of 2.5 to 5.5 and an isocyanate content of 9 to 50 wt % and containing aliphatic polyisocyanates with
  A2) at least 0.7 amino equivalents, based on the NCO equivalents of A1), of an aminosilane corresponding to formula (I) and
  A3) optionally isocyanate-reactive compounds other than A2),
with
B) 20 to 95 wt %, preferably 30 to 80 wt %, based on the weight of A) and B), of at least one hydrolyzable silane corresponding to formula (II) and/or hydrolyzates/condensates obtained from these silanes.

The aliphatic polyisocyanate components for the present invention have an average NCO functionality of 2.5 to 5.5, preferably 2.8 to 5.0 and more preferably of 3.0 to 4.5. The NCO content, based on the solids content of polyisocyanate component, is 9 to 50 wt %, preferably 10 to 30 wt % and more preferably 11 to 25 wt %. The content of monomeric diisocyanate in the aliphatic polyisocyanate component is preferably less than 10 wt %, more preferably less than 2 wt % and most preferably less than 0.5 wt %.

Suitable aliphatic polyisocyanates include polyisocyanate adducts containing biuret, isocyanurate, iminooxadiazine dione, uretdione. allophanate and/or urethane groups. The urethane groups are based on the reaction products of monomeric isocyanates with molecular weight polyfunctional alcohols such as trimethylol propane, 1,6-hexanediol, 1,5-pentanediol, diethylene glycol, triethylene glycol, 2,2,4-trimethyl-l, 3-propanediol, neopentyl glycol and mixtures thereof. These polnisocyanate adducts are described, for example, in J. prakt. Chem., 1994, 336. 185–200, and "Lackharze, Chemie, Eigenschaften und Anwendungen", publ. D. Stoye, W. Freitag, Hanser Verlag, Munich, Vienna 1996.

Particularly preferred are polyisocyanates containing isocyanurate groups (trimers) which have an NCO functionality of 3.0 to 4.5, a monomer content of <2 wt %. They may be prepared by the trimerization process described in EP 330, 996.

The aliphatic polyisocyanate adducts are prepared by the oligomerization of monomeric diisocyanates, as described for example in J. prakt. Chem., 336 (1994) 185–200. Examples of suitable monomeric diisocyanates include 1,4-butane diisocyanate, 1,6-hexane diisocyanate (HDI), 3-isocyanatomethyl-3,3,5-trimethylcyclohexylisocyante (isophorone diisocyanate, IPDI), 2-methyl-1,5-pentane diisocyanate, 2,2,4trimethyl-hexamethylene diisocyanate (TMDI), 1,1 2-dodecane diisocyanate, bis (isocyanatomethyl)norbornane and 4,4'-diisocyanato-cyclohexyl methane.

For better handling, the polyisocyanate (mixtures) Al) can be diluted with up to 50 wt % of conventional paint solvents. Suitable paint solvents are those that are not reactive towards NCO groups, such as butyl acetate, ethyl acetate, 1-methoxy-2-propyl acetate, toluene, 2-butanone, xylene, 1,4-dioxane, N-methyl pyrrolidone, dimethyl acetamide, dimethyl formamide and dimethyl sulphoxide. Preferably, N-methyl pyrrolidone is used.

Polyisocyanates A1) are reacted with at least 0.7 equivalents, preferably at least 0.8 equivalents and more preferably at least 0.9 equivalents, based on the amino groups of component A2) and the isocyanate groups of component A1), of an aminosilane A2) corresponding to formula (I)

(RO)$_n$Y$_{3-n}$Si—CH$_2$CH$_2$CH$_2$—NHZ     (I), wherein

R represents methyl and/or ethyl,

Y represents methyl and/or ethyl,

Z represents H, C$_1$–C$_{12}$ alkyl, CH$_2$CH$_2$CH$_2$—Si(OR)$_2$Y$_{3-n}$ and n has a value of 1, 2 or 3.

Examples of suitable aminosilanes A2) include 3-aminopropyl-trimethoxysilane, 3-aminopropyltriethoxysilane, bis(3-trimethoxysilylpropyl) amine, 3-aminopropyl-methyldiethoxy-silane, 3-(N-methylamino)-propyl-trimethoxysilane, and mixtures thereof. Preferred aminosilanes are 3-aminopropyl-trimethoxysilane and 3-amino-propyl-triethoxysilane.

Any remaining NCO equivalents can optionally be reacted with any other isocyanate-reactive compounds A3), such as aliphatic and cycloaliphatic C$_1$ to C$_8$ alcohols and/or aliphatic or cycloaliphatic C$_1$ to C$_8$ amines. In addition blocking agents, such as butanone oxime, 3,5-dimethyl pyrazole, diethyl malonate and ε-caprolactam can also be used. The remaining NCO equivalents can also be reacted with the low and high molecular weight polyhydroxyl compounds known from polyurethane chemistry, such as polyacrylates, polyethers, polyesters and polycarbonates. These compounds are described, e.g., in "Lackharze, Chemie, Eigenschaften und Anwendungen", publ. D. Stoye, W. Freitag, Hanser Verlag, Munich, Vienna 1996). If these polyols are used, they are preferably reacted with the polyisocyanates prior to the reaction with the aminosilane.

Preferably, no polyols are used and less than 5 equivalent percent of all the original isocyanate groups are reacted with low molecular weight monohydric alcohols, which are used as solvent.

Suitable for use as component B) are hydrolyzable silanes corresponding to formula (II)

QSi(OX)$_3$     (II), wherein

X represents C$_1$ to C$_4$ alkyl and

Q represents H, C$_1$ to C$_8$ alkyl, phenyl, methoxy, ethoxy, 3-glycidyloxy-propyl, 3-aminopropyl and methacryloxypropyl.

Also suitable are hydrolyzates/condensates obtained from these silanes.

Preferred are tetraethoxy silane and hydrolyzate and /or condensates thereof.

Hydrolyzates/condensates are understood to mean compounds that are obtained by partial hydrolysis of at least one silane corresponding to formula (II), optionally in a solvent miscible with water, preferably in an aliphatic alcohol, by reaction with water in the presence of a catalyst. In addition to the silanes according to the invention, other known hydrolyzable silanes known in silicone chemistry may also be used. Mixtures of the preceding silanes can also be used according to the invention.

To prepare the hydrolyzates/condensates, the molar ratio of water to hydrolyzable groups in the silanes of formula (II) is preferably 0.2:1 to 0.7:1, preferably 0.4:1 to 0.6:1. Details of the sol-gel process are described for example by C. J. Brinker and W. Scherer in "Sol-Gel science: The Physics and Chemistry of Sol-Gel Processing", Academic Press, New York (1990).

The weight percentages for the coating compositions according to the invention are based on the weight of polyisocyanate-aminosilane adduct A) and silane B), and do not include solvents and other additives.

The coating compositions according to the invention may contain any of the known solvents from polyurethane chemistry. Preferred solvents include aliphatic alcohols such as ethanol, i-propanol, n-propanol, n-butanol, i-butanol, sec.-butanol and tert.-butanol; ether alcohols such as 1-methoxy-2-propanol and Cl to C$_4$ glycol monoalkyl ethers; dipolar solvents such as N-methylpyrrolidone, dimethyl acetamide, dimethyl formamide, dimethyl sulphoxide and dioxane; aromatic solvents such as toluene and xylene; and esters and ether esters such as ethyl acetate, butyl acetate and methoxypropyl acetate.

The coating compositions may also contain the known additives from polyurethane chemistry, such as inorganic pigments, organic pigments, fillers, plasticizers, catalysts, inhibitors, adhesion promoters, paint additives and/or dispersing agents.

The process according to the invention for producing the coating compositions, and also for producing polyisocyanate-aminosilane adduct A), can be carried by various procedures. In a preferred embodiment the preparation takes place by adding polyisocyanate A1, optionally diluted with solvent, drop-wise to aminosilane A2, diluted in a solvent, at temperatures of 25 to 30° C. with cooling. It has been found that the additional use of alcohols and/or dipolar solvents contributes to the prevention of precipitates and crystallization. If alcohols are used, they are preferably introduced together with amine component A2. Polyisocyanate Al is preferably used as a 30 to 70% solution in solvents that are not reactive with isocyanates. Preferred are solvents that contain 20 to 100 wt %, preferably 40 to 100 wt %, of N-methylpyrrolidone.

Amine A2 is preferably added as a 10 to 60% solution in alcohol mixtures that preferably contain 50 to 100 wt %, more preferably 80 to 100 wt % of alcoholic solvents. In order to prevent a possibly disruptive amine surplus, it may be advantageous to use the amine component A2 sub-stoichiometrically. After the reaction silane B) is added, optionally with other additives, and optionally a catalyst is added.

Silane B) can be used as such or in the form of a hydrolyzate/condensate obtained by hydrolysis with water and catalyst. If silane B) is used as such, 1 to 25 wt %, preferably 2 to 20 wt % of water (based on the solids content of components A and B), optionally together with a hydrolysis catalyst, is added to the coating composition. Suitable as hydrolysis catalysts are the known condensation catalysts from silicone chemistry, such as those described e.g. in W. Noll, Chemie und Technologie der Silikone, chap. 5.4, p. 179 ff, Verlag Chemie, Weinheim, 1968.

Preferred catalysts are acids, such as hydrochloric acid, sulphuric acid, p-toluenesulphonic acid, trifluoroacetic acid, acetic acid and formic acid. Up to 2%, preferably 0.01 to 0.3%, based on the solids content of the coating composition, of acid can be used. Preferably, silane B) is used as an acid hydrolyzate/condensate. In this case it is advantageous if the water and the catalyst are added to the coating composition with the hydrolyzate/condensate.

After the addition of the catalyst or the hydrolyzate/condensate it may be advantageous if the mixture according to the invention is, prior to application, stirred for some time, preferably up to 60 minutes, at room temperature. Thereafter the sol, which preferably is present as a 10 to 40% sol, can be applied by conventional methods such as spraying, flow coating, knife coating or dipping. The use of a primer may also be appropriate for certain applications.

The pot life of the ready-to-apply coating composition, which is dependent upon the nature and amount of the catalyst and the polyisocyanate mixture used, is generally at least 1 hour.

The coatings, which preferably have a thickness of 2 to 30 µm. attain a sufficient degree of hardness after 24 hours at room temperature. For particular applications, for example in the automotive sector, hardening can also take place at elevated temperature.

The coatings produced from the coating compositions according to the invention exhibit an improved hardness (pencil hardness greater than 7H) and solvent resistance (0.0.0) and are very flexible. Coated steel plates (140 mm×65 mm×0.25 mm) can be bent without difficulty several times up to an angle of 90° C. and straightened out again without spalling or the coating being damaged.

Any substrates, such as plastics (e.g. polycarbonate, polyamide, polyester, ABS, polystyrene, PPO-polyamide blends, PPS), lacquered surfaces, marble, granite, metals, wood, leather and textiles, can be coated with the coating compositions according to the invention.

EXAMPLES

In the following examples are percentages refer to weight, unless otherwise indicated.

The coating compositions were knife coated at a wet film thickness of 120 µm onto degreased glass plates and steel sample plates (140 mm×65 mm×0.25 mm), dried at room temperature for 30 minutes and then stoved for 30 minutes at 130° C.

Testing for Solvent Resistance of the Coating:

Individual pill bottles filled with a wad of cotton wool were saturated in turn with xylene, isopropanol and acetone. The pill bottles were placed with the open side towards the coated glass plate, so that the solvent was able to act on the coating. After an exposure time of five minutes the pill bottles were removed. The coating was examined for changes visually and by touching with the hand. Rating:

0  unchanged, not detected
1  trace changed (visible change only)
2  slightly changed (noticeable softening detectable with the fingernail)
3  clearly changed (pronounced softening detectable with the fingernail)
4  considerably changed (substrate reached by the fingernail)
5  destroyed (coating surface destroyed with no outside action)

Test for Elasticity of the Coating (bending test)

The coating test plates were bent at a table edge up to an angle of 90° C. and then straightened out again. It was evaluated visually whether cracks had occurred and whether the coating had spalled.

Example 1

21.7 g (0.098 moles) of 3-aminopropyltrimethoxy silane were diluted with 21.7 g of ethanol. 39.2 g (0.1 equiv.) of a 70% solution of the isocyanurate of isophorone diisocyanate in butyl acetate (Desmodur Z 4470, available from BaN er AG, isocyanate content 11.5%, NCO functionality 3.5) were mixed with 15.7 g of N-methylpyrrolidone and added drop-wise to the amine solution at 25 to 30° C. with cooling. Finally, the solution was allowed to stand at room temperature until the NCO band in the IR spectrum had disappeared. The reaction product is a storable, clear solution with a solids content of 50%.

Example 2

22.1 g (0.1 moles) of 3-aminopropyltrimethoxysilane were diluted with 105.7 g of ethanol. 19.6 g (0.1 equiv.) of the solvent-free isocyanurate of HDI (Desmodur N 3300 (available from Bayer AG, isocyanate content 21.5%, NCO functionality 3.5) were mixed with 19.6 g of N-methylpyrrolidone and added dropwise to the amine solution at 25 to 30° C. with cooling. The solution was allowed to stand at room temperature until the NCO band in the IR spectrum disappeared. The reaction product is a clear solution with a solids content of 25%.

Example 3

114.4 g of tetraethoxysilane (0.55 moles). 140 g of ethanol and 20 g of 0.1 normal para-toluenesulphonic acid (approx. 1.1 moles $H_2O$) were brought together in a three-neck flask fitted with agitator, internal thermometer and reflux condenser and stirred for 24 h. An exothermic reaction took place. The clear silane hydrolyzate was stable in storable at room temperature in a sealed drum for at least six months.

Example 4

75 g of the reaction product from Example 1 were mixed with stirring with 25 g of the silane hydrolyzate from Example 3 and 36 g of ethanol and stirred at room temperature for 60 minutes. A clear solution having a solids content of 16% and a pot life of 180 minutes was obtained.

Example 5

75 g of the reaction product from Example 2 were mixed with stirring with 25 g of silane hydrolyzate from Example 3 and 13.6 g of ethanol and stirred at room temperature for 60 minutes. A clear solution having a solids content of 13% and a pot life of 180 minutes was obtained.

Comparison Example 6

66.6 g of 0.1 normal para-toluenesulphonic acid (approx. 3.7 moles $H_2O$) were added to a solution of 280 g of tetraethoxysilane (1.35 moles) and 120 g of methyltriethoxysilane (0.67 moles) in 430 g of ethanol in a three-neck flask fitted with agitator, internal thermometer and reflux condenser and stirred for 24 hours. An exothermic reaction took place to form a clear silane hydrolyzate.

Example 7

30.5 g of the silane hydrolyzate from Example 3 were mixed thoroughly with stirring with 14.3 g of n-butanol and 5.2 g of a 65% solution of a polyacrylate/polyester polyol in butyl acetate/xylene (Desmophen A 665, available from Bayer AG) and stirred for 60 minutes at room temperature. A clear solution with a solids content of 14% was obtained.

The properties of the coatings from Examples 4 and 5 according to the invention and comparison Examples 6 and 7 are summarized in Table 1:

TABLE 1

| Example | 4 according to the invention | 5 according to the invention | 6 comparison example | 7 comparison example |
|---|---|---|---|---|
| Film appearance[1] | clear, crack-free | clear, crack-free | clear, cracks | clear, crack-free |
| Pencil hardness[2] | >7H | >7H | >7H | 2H |
| Acetone | 0 | 0 | 0 | 4 |
| Isopropanol | 0 | 0 | 0 | 2 |
| Xylene | 0 | 0 | 0 | 0 |
| Bending test[3] | not detected | not detected | major cracks, coating spalled for most part | |

[1]visual
[2]ASTM D 3363
[3]visual

The sol-gel coatings from Examples 4 and 5 according to the invention have a very good combination of mechanical properties (such as very high hardness), excellent flexibility and very good chemical properties (such as solvent resistance).

Comparison example 6, which is an inorganic sol-gel coating was brittle and not very flexible as shown by the bending test and the degree of spalling. Comparison example 7, which is an acrylate-modified coating, had significantly less hardness and poor solvent resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hybrid coating composition comprising
  A) 5 to 80 wt %, based on the weight of A) and B), of an aliphatic polyisocyanate-aminosilane adduct that is the reaction product of
    A1) a polyisocyanate component having an average NCO functionality of 2.5 to 5.5 and an isocyanate content, based on solids, of 9 to 50 wt % and containing aliphatic polyisocyanates with
    A2) at least 0.7 amino equivalents, based on the NCO equivalents of A1), of an aminosilane corresponding to formula (I)

$$(RO)_n Y_{3-n} Si\text{—}CH_2CH_2CH_2\text{—}NHZ \quad (I),$$

wherein
    R represents methyl and/or ethyl,
    Y represents methyl and/or ethyl,
    Z represents $H_1$, $C_1$–$C_{12}$ alkyl, or $CH_2CH_2CH_2\text{—}Si(OR)_2 Y_{3-n}$ and
    n has a value of 1, 2 or 3 and
    A3) optionally isocyanate-reactive compounds other than A2),
  and
  B) 20 to 95 wt %, based on the weight of A) and B), of at least one hydrolyzable silane corresponding to formula (II)

$$QSi(OX)_3 \quad (II),$$

wherein
    X represents $C_1$ to $C_4$ alkyl and
    Q represents $C_1$ to $C_8$ alkyl, phenyl, methoxy, or ethoxy, and/or a hydrolyzate/condensate obtained therefrom.

2. The coating composition of claim 1 wherein polyisocyanate component A1 has an average NCO functionality of 3.0 and 4.5.

3. The coating composition of claim 1 wherein polyisocyanate component A1 has an isocyanate content, based on solids, of 10 to 30 wt %.

4. The coating composition of claim 2 wherein polyisocyanate component A1 has an isocyanate content, based on solids, of 10 to 30 wt %.

5. The coating composition of claim 1 wherein polyisocyanate component A1 has a content of monomeric diisocyanates of less than 2 wt %.

6. The coating composition of claim 1 wherein at least 0.9 amine equivalents of aminosilane A2 are present for each NCO equivalent of component A1).

7. The coating composition of claim 4 wherein at least 0.9 amine equivalents of aminosilane A2 are present for each NCO equivalent of component A1).

8. The coating composition of claim 1 wherein component A2 comprises 3-aminopropyltriethoxysilane or 3-aminopropyltrimethoxysilane.

9. The coating composition of claim 4 wherein component A2 comprises 3-aminopropyltriethoxysilane or 3-aminopropyltrimethoxysilane.

10. The coating composition of claim 6 wherein component A2 comprises 3-aminopropyltriethoxysilane or 3-aminopropyltrimethoxysilane.

11. The coating composition of claim 7 wherein component A2 comprises 3-aminopropyltriethoxysilane or 3-aminopropyltrimethoxysilane.

12. The coating composition of claim 1 wherein the silane B) comprises tetraethoxysilane or a hydrolyzate/condensate obtained therefrom.

13. The coating composition of claim 4 wherein the silane B) comprises tetraethoxysilane or a hydrolyzate/condensate obtained therefrom.

14. The coating composition of claim 6 wherein the silane B) comprises tetraethoxysilane or a hydrolyzate/condensate obtained therefrom.

15. The coating composition of claim 7 wherein the silane B) comprises tetraethoxysilane or a hydrolyzate/condensate obtained therefrom.

16. The coating composition of claim 8 wherein the silane B) comprises tetraethoxysilane or a hydrolyzate/condensate obtained therefrom.

17. The coating composition of claim 9 wherein the silane B) comprises tetraethoxysilane or a hydrolyzate/condensate obtained therefrom.

18. The coating composition of claim 10 wherein the silane B) comprises tetraethoxysilane or a hydrolyzate/condensate obtained therefrom.

19. The coating composition of claim 11 wherein the silane B) comprises tetraethoxysilane or a hydrolyzate/condensate obtained therefrom.

20. A substrate coated with the coating composition of claim 1.

* * * * *